(12) United States Patent
Leach

(10) Patent No.: US 7,513,217 B1
(45) Date of Patent: Apr. 7, 2009

(54) FLUID DISPENSER FOR AUTOMATICALLY PROVIDING COLD WATER TO ANIMALS

(76) Inventor: Rona Leach, 123 W. Rockingham Rd., Maxton, NC (US) 28364

( * ) Notice: Subject to any disclaimer, the term of this patent is extended or adjusted under 35 U.S.C. 154(b) by 360 days.

(21) Appl. No.: 11/533,195

(22) Filed: Sep. 19, 2006

(51) Int. Cl.
*A01K 7/06* (2006.01)

(52) U.S. Cl. .......................... 119/57.8; 119/72

(58) Field of Classification Search ............... 119/57.8, 119/72, 74, 61.57, 652, 656, 658, 661, 662, 119/663, 469
See application file for complete search history.

(56) References Cited

U.S. PATENT DOCUMENTS

| | | | | |
|---|---|---|---|---|
| 1,162,487 A | * | 11/1915 | Ide | 119/663 |
| 1,171,870 A | * | 2/1916 | Niccum | 119/663 |
| 1,300,297 A | * | 4/1919 | Randall | 119/658 |
| 1,471,109 A | * | 10/1923 | Dick | 119/661 |
| 1,492,142 A | * | 4/1924 | Shoemaker | 119/663 |
| 1,817,449 A | * | 8/1931 | Vaughan | 119/663 |
| 2,653,575 A | * | 9/1953 | Worden | 119/661 |
| 2,711,722 A | * | 6/1955 | Gray | 119/656 |
| 2,988,051 A | * | 6/1961 | Minock | 119/658 |
| 2,991,756 A | * | 7/1961 | Thaete | 119/661 |
| 3,071,111 A | * | 1/1963 | Hamilton | 119/656 |
| 3,118,428 A | * | 1/1964 | Garvin | 119/656 |
| 3,248,016 A | * | 4/1966 | Dahl et al. | 222/189.07 |
| 3,524,433 A | * | 8/1970 | Sampson | 119/656 |
| 3,563,209 A | * | 2/1971 | Mommer | 119/661 |
| 3,577,957 A | * | 5/1971 | Sandig | 119/51.11 |
| 3,638,618 A | | 2/1972 | Strother | |
| 3,677,233 A | * | 7/1972 | White, Jr. | 119/661 |
| 3,727,586 A | * | 4/1973 | Brewster | 119/658 |
| 3,874,341 A | | 4/1975 | Riba | |
| 3,985,104 A | | 10/1976 | Klemer | |
| 4,291,616 A | * | 9/1981 | Taylor | 99/446 |
| 4,870,926 A | * | 10/1989 | Smith | 119/658 |
| D330,099 S | | 10/1992 | Sutherland | |
| 5,245,951 A | * | 9/1993 | Nicholson | 119/72.5 |
| 6,718,911 B2 | | 4/2004 | Greenberg | |
| 2008/0128319 A1 | * | 6/2008 | Noble Colin et al. | 206/745 |
| 2008/0250712 A1 | * | 10/2008 | DiPaolo et al. | 47/79 |

* cited by examiner

*Primary Examiner*—Yvonne R. Abbott
(74) *Attorney, Agent, or Firm*—Advantia Law Group; Michael W. Starkweather; Jason P. Webb

(57) ABSTRACT

A fluid dispenser for automatically providing cold water to animals. There is a first container, configured to contain ice, and having a plurality of holes disposed therethrough; a first and second supporting member each coupled to the first container, and extending vertically therefrom to support the first container. Of the first container there is a first and second portion removably couplable to the other. The first and second portions are substantially identical. Further, the first portion and the second portion are coupled at a substantially vertical interface. Also, the first portion and the second portion are coupled at a substantially horizontal interface. Additionally, there is a second container, substantially below the first container, configured to contain water.

8 Claims, 2 Drawing Sheets

FLUID DISPENSER FOR AUTOMATICALLY PROVIDING COLD WATER TO ANIMALS

BACKGROUND OF THE INVENTION

1. Field of the Invention

The present invention relates to fluid dispensers, specifically to fluid dispensers for automatically providing cold water to animals.

2. Description of the Related Art

In the related art, it is known to use fluid dispensing devices to automatically dispense water for consumption by animals. It is known for owners and caretakers of animals to need to leave such animals unattended for extended periods of time. Over such extended periods of time it becomes necessary to provide water for consumption by the animals. Therefore there is a need for an affordable, durable, practical, safe and easy to use automatic water dispensing device for animals. Some improvements have been made in the field. Examples include but are not limited to the references described below, which references are incorporated by reference herein:

U.S. Pat. No. 3,985,104, issued to Klemer, discloses an automatic animal feeder device for providing a constant supply of solid food and water includes a housing having an upper and a lower compartment therein. An open top receptacle is mounted externally to the housing A tube leads from the upper compartment through the housing to the receptacle for delivery of a water supply from the upper compartment. A pair of drawers are slidably contained in the lower compartment of the housing, wherein the drawers are adapted to receive a supply of animal food. A mechanism is provided for retaining the drawers within the lower compartment and for selectively releasing the drawers at predetermined times to move outwardly from the housing.

U.S. Pat. No. 3,874,341, issued to Riba, discloses a pet tending device includes a cabinet having a spring opened door which withdraws and returns a food bowl carrying slide plate with the opening and closing of the door. A conventional alarm clock having a spring wound alarm motor with a winding shaft is mounted in the cabinet and the shaft rotates a member with the release of the alarm which retracts a latch which releasably locks the door in a closed position. The alarm motor is wound with the rotation of the retraction member in an opposite direction to permit the relocking of the door, the alarm motor shaft rotation being restricted to a predetermined amount. A closed water tank is located in the upper part of the cabinet, and its bottom is connected by a feed tube to an external trough which may be raised and lowered, and the upper part of the tank is connected to a vent tube which terminates in a downwardly directed opening at the upper part of the trough. Various accessories are associated with the cabinet.

U.S. Pat. No. 3,638,618, issued to Strother, discloses an automatic pet feeder controlled by a timer which releases a door to a feed compartment and simultaneously rings a bell to signal the pet that the door has been opened. A second door is released by the same timer at a later time for a second feeding also with a simultaneous ringing of the bell. A supply of water is released by the same timer simultaneously with the opening of one of the doors with the water supply being fed into one of the feeder dishes to moisten dry pet food at the time of its being made available to the pet.

U.S. Pat. No. 6,718,911, issued to Greenberg, discloses a portable animal fluid dispenser including a reservoir and a container detachably mounted to a side wall of the reservoir. The container has an outlet in fluid communication with a passage in the side wall and a closure removably coupled to the passage. A carrier is provided to attach the carrier to an article worn by a person, for example a belt.

U.S. Design Pat. No. 330,099, issued to Sutherland, discloses the ornamental design for a pet waterer.

The inventions heretofore known suffer from a number of disadvantages. Such disadvantages include being complex, unreliable, heavy, and/or being otherwise limited in versatility and application.

What is needed is a fluid dispenser for automatically providing cold water to animals that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available fluid dispensers for automatically providing cold water to animals. Accordingly, the present invention has been developed to provide a fluid dispenser for automatically providing cold water to animals.

In one embodiment, there is a fluid dispenser for automatically providing cold water to animals. There may be a first container, configured to contain ice, which may have a plurality of holes disposed substantially along an underside of the first container; there may be a first supporting member, coupled to the first container, which may extend vertically from the first container, and may be configured to support the first container; and/or there may be a second supporting member, coupled to the first container, which may extend vertically from the first container substantially opposite the first supporting member, and may be configured to support the first container.

The fluid dispenser for automatically providing cold water to animals may include a second container, which may be substantially below the first container, in fluid communication with the first container, and it may be configured to contain water.

Of the fluid dispenser for automatically providing cold water to animals the first container may include; a first portion; and/or a second portion, which may be removably coupled to the first portion. Additionally, the first and second portions may be substantially identical. Further, the first portion and the second portion may be coupled at a substantially vertical interface. Additionally, the first portion and the second portion may be coupled at a substantially horizontal interface.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
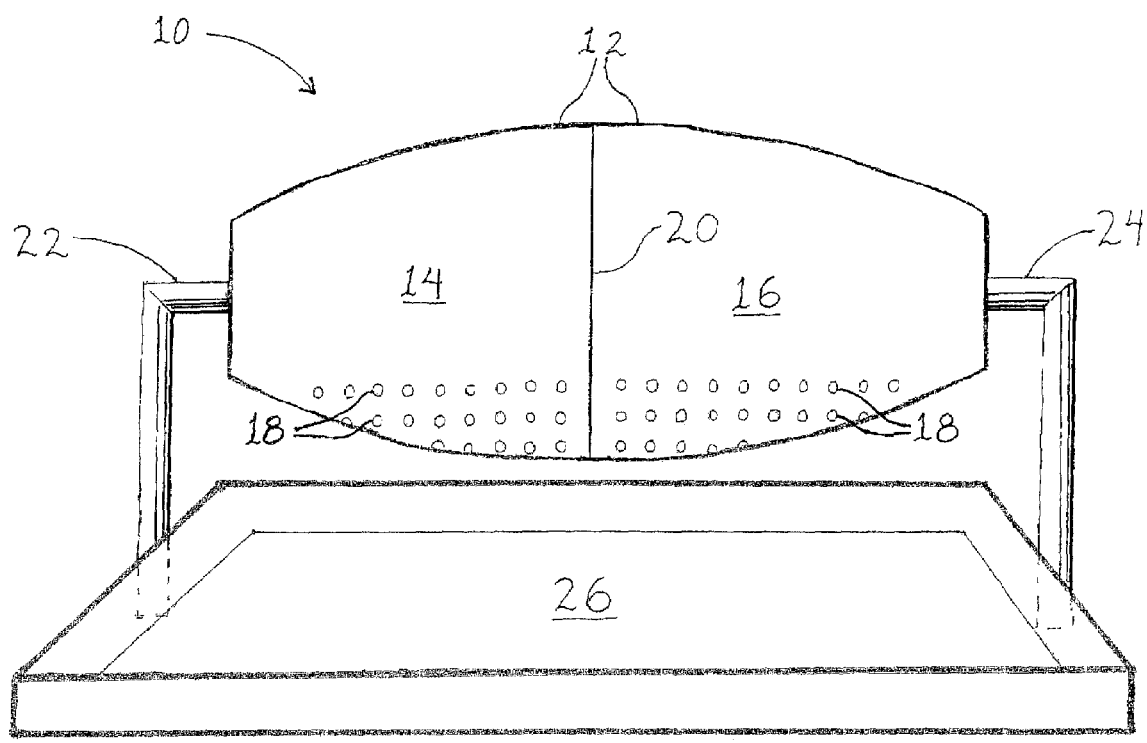
FIG. 1 illustrates a front perspective view of a fluid dispenser, according to one embodiment.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to "one embodiment," "an embodiment," or similar language means that a particular feature, structure, or characteristic described in connection with the embodiment is included in at least one embodiment of the present invention. Thus, appearances of the phrases "one embodiment," "an embodiment," and similar language throughout this specification may, but do not necessarily, all refer to the same embodiment, different embodiments, or component parts of the same or different illustrated invention. Additionally, reference to the wording "an embodiment," or the like, for two or more features, elements, etc. does not mean that the features are related, dissimilar, the same, etc. The use of the term "an embodiment," or similar wording, is merely a convenient phrase to indicate optional features, which may or may not be part of the invention as claimed.

Each statement of an embodiment is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The independent embodiments are considered to be able to be combined in whole or in part one with another as the claims and/or art may direct, either directly or indirectly, implicitly or explicitly.

Finally, the fact that the wording "an embodiment," or the like, does not appear at the beginning of every sentence in the specification, such as is the practice of some practitioners, is merely a convenience for the reader's clarity. However, it is the intention of this application to incorporate by reference the phrasing "an embodiment," and the like, at the beginning of every sentence herein where logically possible and appropriate.

FIG. 1 illustrates a front perspective view of a fluid dispenser 10, according to one embodiment. As shown, the fluid dispenser 10 includes a first container 12 and a second container 26. The first container 12 being disposed substantially above the second container 26, such that the first container 12 has an elevation greater than that of the second container 26.

As illustrated in FIG. 1, the first container 12 includes a first portion 14 and a second portion 16. As shown, the portions, 14 and 16, together form an enclosure. Additionally, the portions, 14 and 16, are substantially identical to each other. As is shown, each portion, 14 and 16, is tubular while generally having a frusto-conical shape and having an open end and a closed end. Additionally as illustrated, each portion, 14 and 16, has a plurality of holes 18 substantially disposed on the lower most elevation thereof. Such holes 18 extend entirely through the tubular wall of the portions, 14 and 16, such that there may be fluid communication from the interior of the first container 12 through to the exterior of the same. Further, in one embodiment, there is disposed on the open ends of the portions, 14 and 16, a coupling interface 20. Such coupling interface 20 includes a spirally formed surface allowing for twist and lock coupling of the portions, 14 and 16. Further in one embodiment, the first portion 14 has a male helical surface, while the second portion 16 has a female helical surface thereby allowing interconnection of the two portions, 14 and 16, by an aligned twist and lock motion.

In FIG. 1, the fluid dispenser 10 includes a first support member 22 and a second support member 24. As shown the first support member 22 is fixably attached to the first portion 14 of the first container 12. As shown the second support member 24 is fixably attached to the second support member 16 of the first container 12. As illustrated the support members, 22 and 24, are substantially identical. The support members, 22 and 24, have a solid cross-section and are tubular shape. The support members, 22 and 24, extend perpendicularly from the point of fixable attachment at the respective portions, 14 and 16, for some short distance then make a right angle bend and further extend for a greater distance downward until terminus within the ground 32 at some point.

In FIG. 1, there is a second container 26 disposed substantially below the first container 12 and in between the support members, 22 and 24. In one embodiment, the second container 26 is an open rectangular shape; being enclosed on the bottom and the four vertical sides and being open at the top thereof. The second container 26 having a substantial wall thickness for the structural integrity of the same.

Figure 2:
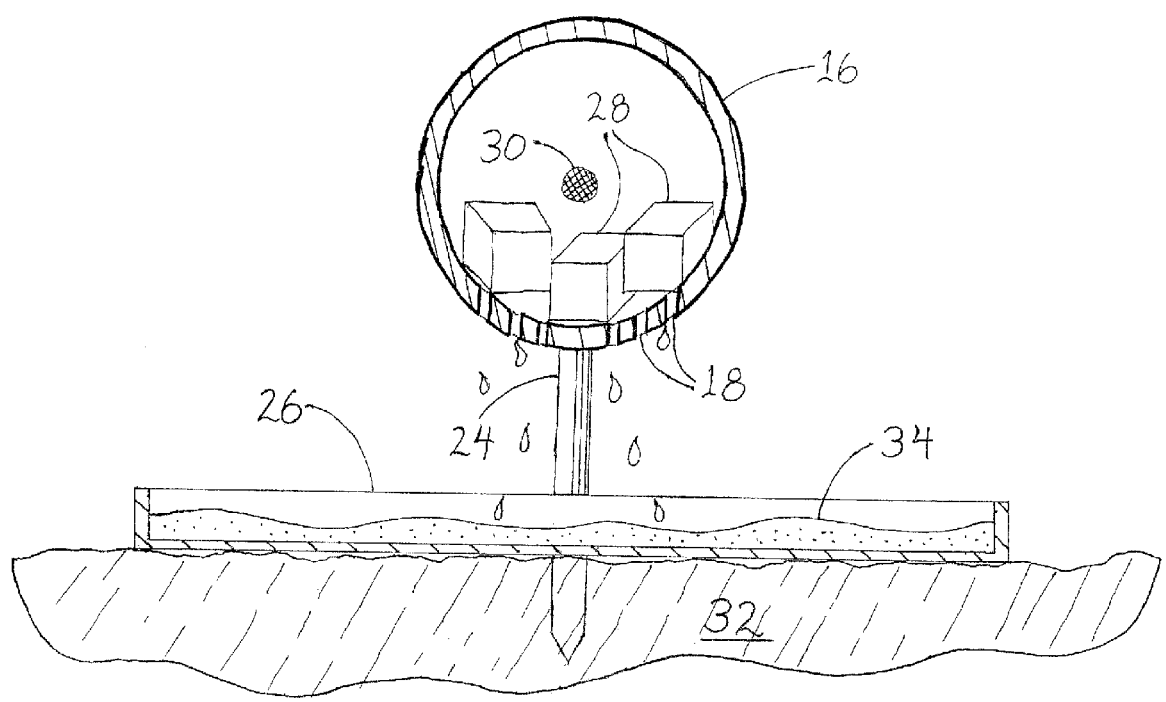
FIG. 2 illustrates a side cross sectional view of a fluid dispenser, according to one embodiment.

FIG. 2, illustrates a side cross sectional view of a fluid dispenser, according to one embodiment. A cross-sectional view of the second portion 16 is identified in FIG. 2 however such is also illustrative of a cross-sectional view of the first portion 14. As shown, the second portion 16 has holes 18 disposed at the lower section thereof. Additionally, there is illustrated the attachment point 30 at which the second support member 24 is fixably attached thereto. Within the second portion 16 is shown a plurality of ice cubes 28. Further, as shown, the second container 26 is disposed upon the ground 32 being substantially below the second portion 16 of the first container 12. Within the second container 26 there is illustrated water 34 amassed as result of precipitation from the first container 12 via the holes 18 therein.

In operation, a user may take the first container 12 such that the first portion 14 is in one hand and the second portion 16 is in the other hand and twist the portions, 14 and 16, oppositely from the other so as to become uncoupled. A user may take ice which may be formed as cubes, crushed and/or other shape and place such within one or both of the portions, 14 and 16, of the first container 12. A user may re-couple the portions, 14 and 16, of the first container 12. Re-coupling may be accomplished by aligning the open faces thereof, pushing together and twisting oppositely each portion, 14 and 16, until the spirally formed surfaces engage one another and twisting with reasonable force is no longer possible. With the first container 12 having ice 28 therein a user may position the same above the second container 26. To position a user may grasp the support members, 22 and 24, each in a separate hand and at a chosen location thrust, with a downward force, the support members, 22 and 24, into the ground 32 or into receiving members of the second container 26 that are configured to receive the support members, 22 and 24. Proper depth into the ground varies with the substrate and is determinable by one skilled in the art. A user may position or reposition the second container 26 after the first container 12 has been removably attached into the ground via the support members, 22 and 24. It is envisioned that the user may position the second container 26 under the first container 12 so as to capture all liquid water dripping therefrom.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claim rather than by the foregoing description. All changes which come within the meaning and range of equivalency of the claims are to be embraced within their scope.

For example, although the shape of the first container 12 is illustrated substantially as a tubular structure, it is envisioned that most any shape may suffice including; semispherical, rectangular, or pyramidic. Additionally, it is envisioned that the orientation of the portions, 14 and 16, may be varied. For example, in an alternative embodiment, a first portion 14 may be disposed below a second portion 16 thus having a horizontally oriented coupling interface 20.

Additionally, although the figures illustrate that the holes 18 disposed in the portions, 14 and 16, of the first container 12 are round, it is envisioned that the shape may vary. For example, in an alternative embodiment, the shape of the holes 18 may be; oval, slotted, rectangular, triangular, and/or diamond shaped. Further, the size of the holes may vary uniformly or non-uniformly in alternative embodiments. It is envisioned that the number of holes 18 used in each embodiment may vary.

It is also envisioned that, the support members, 22 and 24, may be fixably attached at alternative locations on the portions of the first container in alternative embodiments. Additionally the shape and size of the support members may be varied according to whatever size and shape may be desirable to fulfill the essence of the present invention. It is further envisioned that the material of the support members, 22 and 24, may be a metal, polymer, organic material or any other material that fulfills the function of such members.

While the figures illustrate that the second container 32 is a shallow open rectangular structure, other shapes may be used. It is envisioned that, the second container may be of different shapes such as; an open circular cylinder, open cube, open elliptical cylinder, or any other shape having an opening disposed at the top surface there of able to be disposed beneath a first container.

It is expected that there could be numerous variations of the design of this invention. In an alternative embodiment, it is envisioned that, the first container 12, second container 26 and support members, 22 and 24, may be integrated as one continuous structure having a first portion removably attached to a second portion so as to allow the input of ice therein. Such embodiment may include means for fixably attaching the fluid dispenser to the ground.

Finally, it is envisioned that the components of the device may be constructed of a variety of materials. The first container 12 and the second container 26 may be composed of the same or different materials as the other. An example of materials include; metals such as aluminum, steel, titanium, tin and/or brass, plastics such as poly-vinyl-chloride, polypropylene, polystyrene, and/or polyethylene, organic materials such as wood, or ceramics such as glass and/or clay.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. A fluid dispenser for automatically providing cold water to animals, comprising:
    a first container, configured to contain ice, and having a plurality of holes disposed substantially along an underside of the first container; wherein the first container includes:
        a first portion; and
        a second portion, removably coupled to the first portion;
    a second container, substantially below the first container, in fluid communication with the first container, and configured to contain water;
    a first supporting member, coupled to the first container, extending vertically from the first container, and configured to support the first container; and
    a second supporting member, coupled to the first container, extending vertically from the first container substantially opposite the first supporting member, and configured to support the first container.

2. The dispenser of claim 1, wherein the first and second portions are substantially identical.

3. The dispenser of claim 2, wherein the first portion and the second portion are coupled near a substantially vertical interface.

4. The dispenser of claim 2, wherein the first portion and the second portion are coupled near a substantially horizontal interface.

5. A fluid dispenser for automatically providing cold water to animals, consisting essentially of:
    a first container, configured to contain ice, and having a plurality of holes disposed substantially along an underside of the first container; wherein the first container includes:
        a first portion; and
        a second portion, removably coupled to the first portion;
    a first supporting member, coupled to the first container, extending vertically from the first container, and configured to support the first container;
    a second supporting member, coupled to the first container, extending vertically from the first container substantially opposite the first supporting member, and configured to support the first container; and
    a second container, substantially below the first container, in fluid communication with the first container, and configured to contain water.

6. The dispenser of claim 5, wherein the first and second portions are substantially identical.

7. The dispenser of claim 6, wherein the first portion and the second portion are coupled near a substantially vertical interface.

8. The dispenser of claim 6, wherein the first portion and the second portion are coupled near a substantially horizontal interface.

* * * * *